US010168941B2

(12) United States Patent
Jagannath et al.

(10) Patent No.: US 10,168,941 B2
(45) Date of Patent: Jan. 1, 2019

(54) HISTORICAL STATE SNAPSHOT CONSTRUCTION OVER TEMPORALLY EVOLVING DATA

(71) Applicant: International Business Machines Corporation, Armonk, NY (US)

(72) Inventors: Srikanta B. Jagannath, Bangalore (IN); Sriram Lakshminarasimhan, Bangalore (IN); Sameep Mehta, Bangalore (IN); Animesh Nandi, Bangalore (IN); Narendran Sachindran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 15/047,780

(22) Filed: Feb. 19, 2016

(65) Prior Publication Data

US 2017/0242591 A1    Aug. 24, 2017

(51) Int. Cl.
*G06F 17/30* (2006.01)
*G06F 3/06* (2006.01)

(52) U.S. Cl.
CPC ............ *G06F 3/0644* (2013.01); *G06F 3/061* (2013.01); *G06F 3/0676* (2013.01); *G06F 17/30902* (2013.01)

(58) Field of Classification Search
None
See application file for complete search history.

(56) References Cited

U.S. PATENT DOCUMENTS

| 5,923,832 A * | 7/1999 | Shirakihara ......... G06F 11/1438 |
| | | 712/228 |
| 2007/0220327 A1 | 9/2007 | Ruscio et al. |
| 2013/0212068 A1 * | 8/2013 | Talius ............... G06F 17/30088 |
| | | 707/639 |
| 2015/0081636 A1 | 3/2015 | Schindler et al. |

(Continued)

OTHER PUBLICATIONS

Samthebest et al., How to Define Custom partitioner for Spark RDDs of equally sized partition where each partition has equal number of elements? Aug. 14, 2016, stackoverflow.com, https://stackoverflow.conn/questions/23127329/how-to-define-custom-partitioner-for-spark-rdds-of-equally-sized-partition-where.*

(Continued)

*Primary Examiner* — Jason G Liao
(74) *Attorney, Agent, or Firm* — Ryan, Mason & Lewis, LLP (57) ABSTRACT

Methods, systems, and computer program products for historical state snapshot construction over temporally evolving data are provided herein. A computer-implemented method includes classifying each of multiple temporally evolving data entities into one of multiple categories based on one or more parameters; partitioning the multiple temporally evolving data entities into multiple partitions based at least on (i) said classifying and (ii) the update frequency of each of the multiple temporally evolving data entities; implementing multiple checkpoints at a distinct temporal interval for each of the multiple partitions; and creating a snapshot of the multiple temporally evolving data entities at a selected past point of time (i) based on said implementing and (ii) in response to a query pertaining to a historical state of one or more of the multiple temporally evolving data entities.

17 Claims, 6 Drawing Sheets

(56) References Cited

U.S. PATENT DOCUMENTS

2015/0212894 A1 7/2015 Pawar et al.
2015/0235038 A1* 8/2015 Inoue ............... G06F 17/30584
　　　　　　　　　　　　　　　　　　　　　　707/737

OTHER PUBLICATIONS

Salzberg et al., Comparison of Access Methods for time-evolving data. In ACM Computing Surveys, vol. 31 (1999).
Elmasri et al., The Time-Index: An Access Structure for Temporal Data, VLDB '90 Proceedings of the 16th International Conference on Very Large Data Bases. 1990.
Jensen et al., Using Differential Techniques to Efficiently Support Transaction Time, VLDB Journal2 (1):75-111 (1993).
Leung et al., Temporal Query Processing and Optimization in Multiprocessor Database Machines, VLDB 1992 Proceedings of the 18th International Conference on Very Large Data Bases.
Tsotras et al., The Snapshot Index: An I/O-Optimal Access Method for Timeslice Queries, Information Systems vol. 20, No. 3, pp. 237-260, 1995.

* cited by examiner

HISTORICAL STATE SNAPSHOT CONSTRUCTION OVER TEMPORALLY EVOLVING DATA

FIELD

The present application generally relates to information technology, and, more particularly, to management of temporally evolving data.

BACKGROUND

Constructing a historical state snapshot over temporally evolving data presents multiple challenges. Existing approaches commonly suffer from conflicting trade-offs between checkpoint overhead costs and replay overhead costs. For example, reducing replay overheads by reducing checkpoint intervals generally leads to increased checkpoint overhead costs, while reducing checkpoint overhead costs by increasing checkpoint intervals generally leads to increased replay overhead costs.

SUMMARY

In one embodiment of the present invention, techniques for historical state snapshot construction over temporally evolving data are provided. An exemplary computer-implemented method can include steps of classifying each of multiple temporally evolving data entities into one of multiple categories based on one or more parameters; partitioning the multiple temporally evolving data entities into multiple partitions based at least on (i) the classifying step and (ii) the update frequency of each of the multiple temporally evolving data entities; implementing multiple checkpoints at a distinct temporal interval for each of the multiple partitions; and creating a snapshot of the multiple temporally evolving data entities at a selected past point of time (i) based on the implementing step and (ii) in response to a query pertaining to a historical state of one or more of the multiple temporally evolving data entities.

In another embodiment of the invention, an exemplary computer-implemented method can include steps of caching the implemented checkpoints across the multiple partitions, and creating a snapshot of the multiple temporally evolving data entities at a selected past point of time (i) based on the cached checkpoints and (ii) in response to a query pertaining to a historical state of one or more of the multiple temporally evolving data entities.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques for historical state snapshot construction over temporally evolving data. Given a set of temporally evolving entities, one or more embodiments of the invention can include efficiently constructing a state-snapshot (S(t)) for some time (t) in the past. As used herein, each entity can refer to a data record that is associated with some data that can be updated over time. Constructing the historic snapshot S(t) enables the answering and/or resolving of arbitrarily complex queries on the historic state that existed at historic point t. Additionally, given a temporally-evolving graph, one or more embodiments of the invention can include efficiently constructing G(t) to execute arbitrary graph queries on the historic state of the graph that existed at historic point t. As detailed herein, G(t) is the snapshot of the graph at time 't.'

Additionally, at least one embodiment of the invention includes overcoming potentially conflicting trade-offs between checkpoint overhead costs and replay overhead costs by partitioning the set of temporally evolving entities into multiple different categories or partitions based on the average-lifespan and/or update-frequency of each entity. As described herein, determining checkpoint overhead can include taking the snapshot of a current state of a collection of data records (for example, a database) and storing the data associated with the checkpoint on disk for possible future retrieval during snapshot reconstruction. Note that an on-disk checkpoint can be associated with the time 't' at which the snapshot was taken. The primary overhead associated with checkpointing (referred to herein as checkpoint overhead) includes the size of the on-disk footprint of the stored checkpoint state. As noted herein, creating checkpoints can lead to large amounts of storage expansion. To combat such storage expansion, a system often can only afford to checkpoint periodically, using a checkpoint interval that ensures that the total storage cost of all checkpoints is within the limits of the aggregate storage capacity available. Given that checkpoints are taken only at some discrete times, reconstructing the snapshot at some historic time 't_query' requires retrieving the latest checkpoint that was taken before t_query (for example, t_checkpoint), and replaying the operations and/or transactions that occurred in the time-interval [t, t_query]. Note that each operation and/or transaction captures details of the update made to a particular data record. Replaying such operations and/or transactions, inturn, requires maintaining a transaction log that records details of the operations and/or transactions that were performed on the collection of data records (such as a database). This overhead of replaying the operations and/or transactions (referred to herein as replay overhead) is proportional to the number of operations and/or transactions that occurred in the period [t_checkpoint, t_query]. Based on the amortized analysis of queries at different points in time in the past, it can be illustrated, for example, that the greater the time-interval between checkpoints, the higher the volume of transactions and/or operations that need to be replayed on average, and consequently, the higher the replay overhead when reconstructing the snapshot at a historic time.

Partitioning such as noted above can include, for example, creating different partitions for slow-changing, medium-paced-changing, and fast-changing entities. As used herein, data records that are updated frequently are referred to as fast moving data entities or records, and data records that are rarely updated are referred to as slow-moving data entities or records.

One or more embodiments of the invention can also include using different checkpoint-intervals for different partitions. By way of example, larger intervals (relative to other intervals associated with other partitions) can be utilized for partitions with lesser update frequencies (that is, slow-moving entities) to overcome a possible trade-off between (i) ingestion and/or storage and (ii) disk input/output (I/O). At least one embodiment of the invention can also include treating S(t) as a layered sum of checkpoints from different partitions and prioritizing the caching of checkpoints of partitions with relatively lesser update-frequencies (that is, slow-moving entities) to efficiently re-use computations across queries within a given temporal vicinity.

Figure 3:
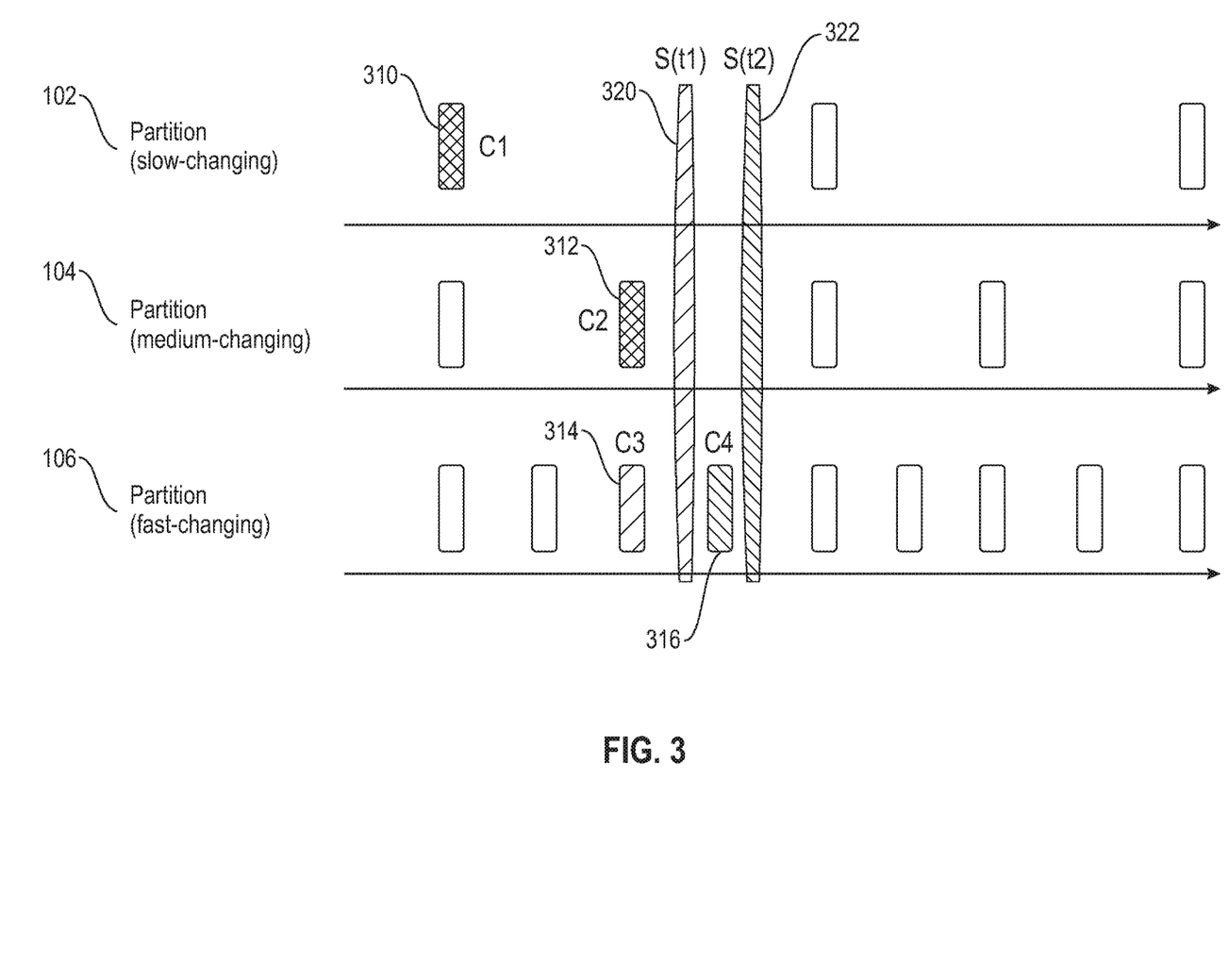
FIG. 3 is a diagram illustrating aspects of an exemplary embodiment of the invention.

By way of illustration, and as shown in FIG. 3, assume that it is desired to reconstruct the snapshot at two historic times, 't1' and 't2,' which are near to each other in time. When computing the snapshot at time 't1,' S(t1), at least one embodiment of the invention includes retrieving the checkpoints C1, C2, and C3. Computing the snapshot at time 't2,' S(t2), requires retrieving the checkpoints C1, C2, and C4. Note that, typically, if the query times of the snapshots to be reconstructed (here, t1 and t2) are very near in time, then with high probability, the checkpoints from the slow-changing and medium-changing partitions will be common across the two queries (here, C1 and C2). In general, the probability of re-using the already-retrieved checkpoint (and thereby being available in memory) from a recent query is highest for the slow-changing partition, and lowest for the fast-changing partition. Accordingly, one or more embodiments of the invention can include prioritizing the in-memory caching of slow-changing partitions over fast-changing partitions. Such prioritization ensures more available space in memory for prioritizing the caching of slow-changing partitions over fast-changing partitions, and thereby even more effective re-use of in-memory cached checkpoints, thus reducing the overhead of reading on-disk checkpoints and converting such checkpoints to their respective in-memory representations. As such, one or more embodiments of the invention can include leveraging the categorization of entities to set different checkpoint intervals and caching the checkpoints in the memory subsystem differently.

As also detailed herein, one or more embodiments of the invention include techniques pertaining to snapshot query execution. Such an embodiment can include constructing a snapshot S(t) at historic time t. The entire snapshot S(t) or one or more portions thereof can reside in memory and can be fetched on-demand from disk. Additionally, at least one embodiment of the invention can further include evaluating a query over the constructed snapshot S(t). By way of example, assume a scenario wherein a user desires to analyze the popularity of different web pages at some point(s) in the past in order to understand how the popularity of the web pages evolved over time. To compute the popularity of the web pages at any instant of historic time 't,' an example embodiment of the invention can include executing a page-rank graph algorithm on a historic snapshot of the web graph. To analyze how this popularity changes the historic web graph, such an example embodiment of the invention would include executing the page-rank graph algorithm once per snapshot, over each of the snapshots computed at different points in time. In general, reconstructing a historic snapshot enables resolving any arbitrary query on the state of given data records at a historic point in time.

As described herein, in one or more embodiments of the invention, S(t) can be proactively computed at periodic checkpoints. Alternative, in an example embodiment of the invention that includes implementing checkpoints, S(t) can be computed based on an on-demand computed checkpoint pertaining to a previous query (S(t_previous_query)) followed by replay of one or more updates in the time-interval between the queries. With such embodiments, the on-disk checkpoint state can be efficiently de-serialized.

Figure 1:
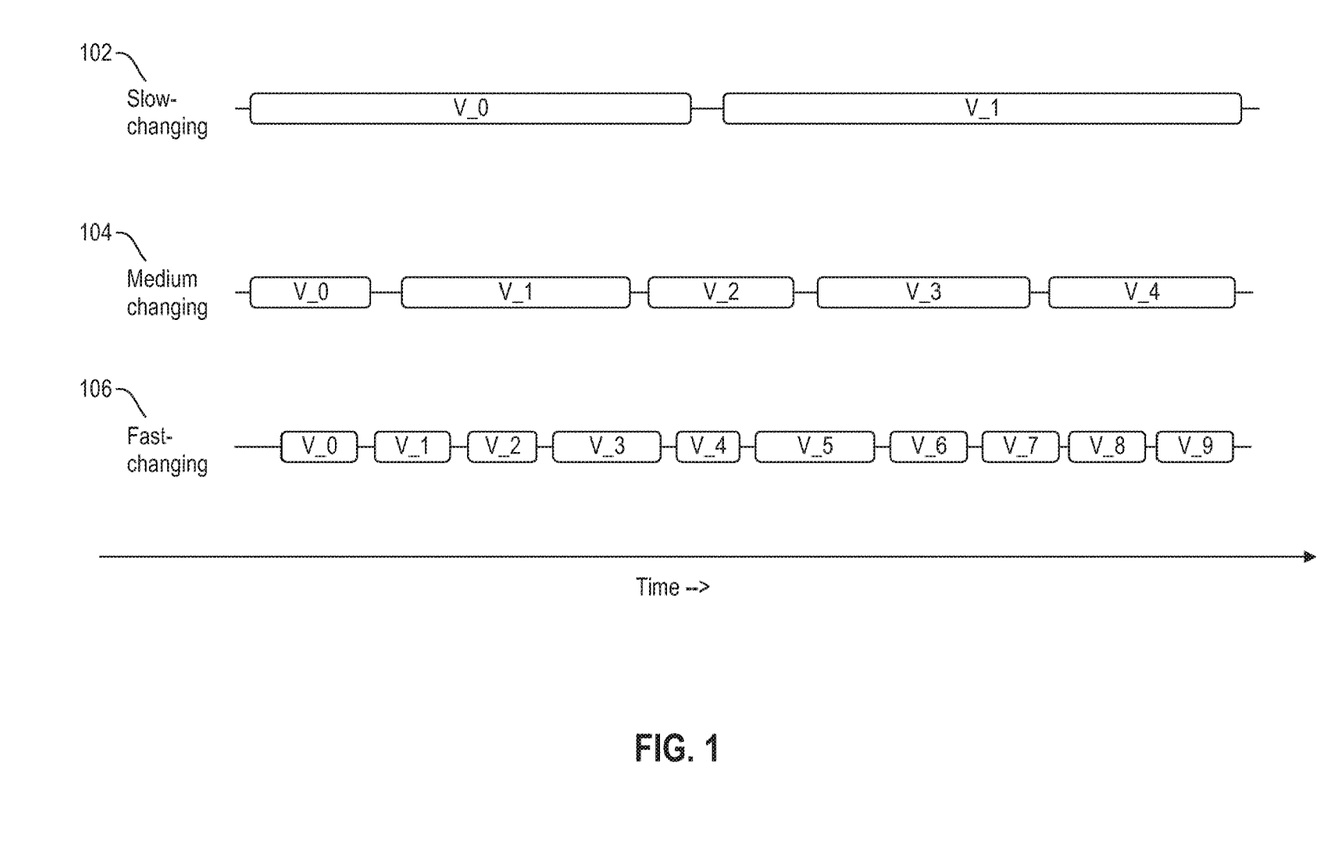
FIG. 1 is a diagram illustrating aspects of an exemplary embodiment of the invention.

FIG. 1 is a diagram illustrating aspects of an exemplary embodiment of the invention. By way of illustration, FIG. 1 depicts classification of entities into different partitions. Specifically, FIG. 1 depicts classification of a first partition 102 associated with slow-changing entities, a second partition 104 associated with medium-paced-changing (medium-changing) entities, and a third partition 106 associated with fast-changing entities. By way of example, at least one embodiment of the invention can include classifying and/or partitioning a set of entities based on the average lifespan and/or the update frequency of each entity (as illustrated via the various "v_x" entries depicted in FIG. 1).

Figure 2:
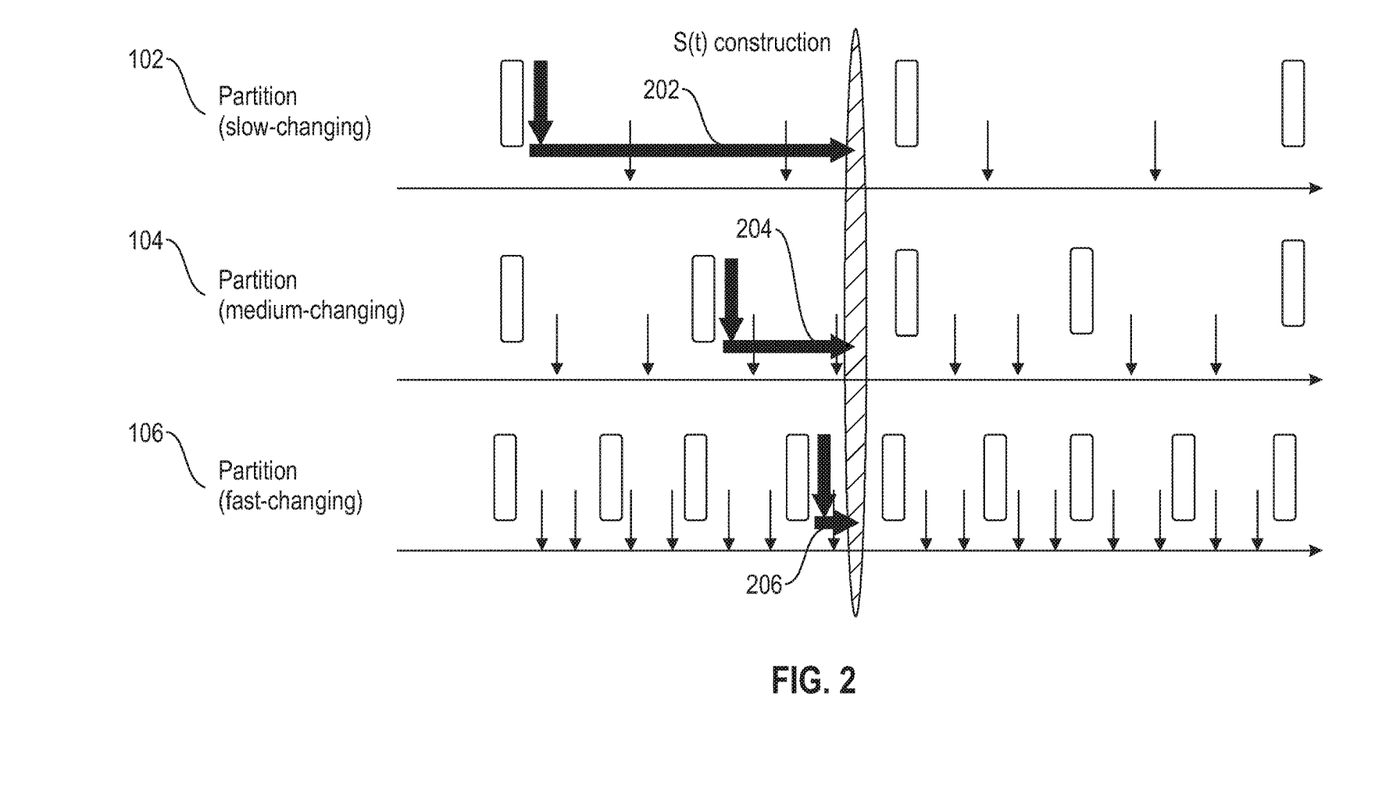
FIG. 2 is a diagram illustrating aspects of an exemplary embodiment of the invention.

FIG. 2 is a diagram illustrating aspects of an exemplary embodiment of the invention. By way of illustration, FIG. 2 depicts the first partition 102 associated with slow-changing entities, the second partition 104 associated with medium-paced-changing (medium-changing) entities, and the third partition 106 associated with fast-changing entities. Additionally, FIG. 2 depicts different checkpoint intervals for the different partitions. For example, one or more embodiments of the invention can include implementing a wider and/or larger checkpoint interval 202 for a slow-changing entity partition 102 as compared to a medium-changing entity partition 104, which, in turn, has a wider and/or larger checkpoint interval 204 as compared to a fast-changing entity partition 106, which has the narrowest and/or smallest checkpoint interval 206 of all of the partitions.

FIG. 3 is a diagram illustrating aspects of an exemplary embodiment of the invention. By way of illustration, FIG. 3 depicts the first partition 102 associated with slow-changing entities, the second partition 104 associated with medium-paced-changing (medium-changing) entities, and the third partition 106 associated with fast-changing entities. FIG. 3 also depicts a first snapshot (S(t1)) 320 at a first time instance (t1) and a second snapshot (S(t2)) 322 at a subsequent time instance (t2) across partitions 102, 104 and 106. Additionally, as further depicted in FIG. 3, partition 102 includes checkpoint (C1) 310, partition 104 includes checkpoint (C2) 312, and partition 106 includes checkpoint (C3) 314 and checkpoint (C4) 316.

As detailed herein and in accordance with the example depicted in FIG. 3, one or more embodiments of the invention can include classifying and partitioning entities into different categories (such as partition 102, partition 104, and partition 106) based on the average-lifespan and/or update frequency of each entity. Additionally, such embodiments of the invention can include using and/or implementing different checkpoint intervals for different partitions. For example, and as depicted in FIG. 3, a slow-changing entity partition (such as partition 102) can include wider checkpoint intervals (that is, longer periods of time in between checkpoints) in relation to medium-changing and fast-changing entity partitions to address potential checkpoint overhead costs versus replay overhead costs trade-offs.

At least one embodiment of the invention can additionally include carrying out preferential caching of checkpoints of slower-changing entity partitions (that is, slower in relation to other entity partitions) to enable re-use of one or more computations across queries within a given temporal vicinity. Referring again to FIG. 3, because a snapshot (as constructed via one or more embodiments of the invention) can be viewed as a layered sum of checkpoints from different partitions, the slow-changing partition's (layer's) checkpoints can be re-used across queries within a given temporal vicinity. In one or more embodiments of the invention, the nature of the application determines the temporal vicinity. Typically, in many applications, there can be a requirement to explore the state within a time-interval centered around some historic time 't.' As such, a related interval can include [t−delta, t+delta]. Additionally, within such an interval, a user might desire to reconstruct the snapshot at multiple points.

For example, FIG. 3 depicts the re-use of checkpoint (C1) 310 and checkpoint (C2) 312 across S(t1) 320 and S(t2) 322. Further, as illustrated in FIG. 3, checkpoints (C1) 310 and (C2) 312 (both shaded with a crisscross pattern) are re-used across S(t1) 320 and S(t2) 322, checkpoint (C3) 314 (shaded with a horizontal pattern) is used at S(t1) 320 only, and checkpoint (C4) 316 (shaded with a vertical pattern) is used at S(t2) 322 only.

With respect to disk read overheads and storage costs, by selecting different checkpoint intervals for different partitions, at least one embodiment of the invention includes overcoming potential ingestion/storage versus disk I/O replay trade-offs by necessitating less replication of states of long-living entities across checkpoints, while maintaining bounded replay and/or de-serialization disk I/O costs, by setting larger checkpoint intervals for slow-moving entity partitions and smaller intervals for fast-moving entity partitions.

Additionally, and as further detailed herein, with respect to amortized snapshot reconstruction costs across queries, by treating a snapshot S(t) as a layered-sum of partial checkpoints from each of multiple partitions, and by prioritizing the caching of checkpoints of slow-changing entity partitions, at least one embodiment of the invention can include efficiently re-using prior computations for queries within a given temporal vicinity. For instance, consider an example scenario including two points of time, t1 and t2, which are within a given temporal vicinity. Accordingly, once S(t1) has been computed, a computation of S(t2) can include subtracting only the fast-changing entity partition checkpoint at t1 from S(t1) (such as checkpoint (C3) 314 in FIG. 3) and adding the new fast-changing entity partition checkpoint at t2 (such as checkpoint (C4) 316 in FIG. 3).

As also detailed herein, one or more embodiments of the invention can include classifying entities to different partition categories. Such classifications can be carried out, for example, as a domain-knowledge based classification, wherein certain entities are known to change at a given rate of speed (slow, medium-paced, fast, etc.), and such entities are classified accordingly. By way of example, network connections often change fast, whereas installed-packages rarely change (or change slowly). Such classifications can also be carried out, for example, as a real-time inference of the average lifespan or the rate-of-change of entities. In such classification techniques, the average lifespan of versions of each entity can be tracked, and a related classification can be used to form the partitions. At least one embodiment of the invention can also include periodically re-classifying entities as necessary.

The number of partitions selected and/or implemented can be based on one or more parameters. For example, the number of partitions selected and/or implemented can be a function of the distribution of the size of each potential partition and the update frequency of the entities associated with each partition. Additionally, the number of partitions selected and/or implemented can be a function of the ratio of disk sequential-read cost to random-seek cost. Also, one or more embodiments of the invention can include implementing and/or computing pro-active-checkpoints and/or on-demand checkpoints. In such embodiments, the S(t_previous_query) snapshot can be utilized and/or considered as a reference checkpoint.

By way of example, assume that S(t1) has been computed. To construct S(t2) efficiently when t2 is in a given temporal vicinity of t1, at least one embodiment of the invention can include creating a cache of on-demand checkpoints (on a per-partition basis) created at the query time (here, t1). To compute S(t2), on a per-partition basis, the reference checkpoint is the checkpoint that is closest in time-difference amongst the proactively created checkpoint(s) and the on-demand created checkpoint(s).

Example use cases for implementing one or more embodiments of the invention can include enabling forensics and root-cause diagnosis using fine-grained machine-state data. With respect to vulnerability forensics, an example embodiment of the invention can include evaluating whether or not a given snapshot S(t) satisfies a vulnerability pattern predicate, wherein typical patterns require checking predicates on nodes and edges of a graph sub-structure pattern. For example, consider a cloud virtual-machine (VM) having a state that is represented as a collection of data records, wherein there is a data record for each machine-entity (for example, a running process, an installed package, a network connection, a mounted disk partition, etc.) that captures the state of that machine-entity. To carry out vulnerability forensics, for example, at least one embodiment of the invention can include determining if there is a specific pattern that is satisfied among the data records. For instance, to determine if a data record is subject to the Heartbleed vulnerability, an example embodiment of the invention can include determining if there is any process record that is using the shared-library openss1-1.1.0 and that is running on a privileged port. Such queries can be represented, in general, via graph-queries after representing the machine data in the form of the graph, wherein the nodes hold the data record of each machine-entity and the edges hold the data records about the relationship details between different machine-entities (for example, the link between a node representing a running process and the node representing an installed package indicates that the running process is accessing the installed package/software). In order to determine if the VM could have been potentially infected due to the Heartbleed vulnerability, an example embodiment of the invention can include reconstructing the snapshot of the VM at multiple historic points in time and evaluating the graph-query expressing the vulnerability-signature predicate on the reconstructed historic snapshots.

Figure 4:
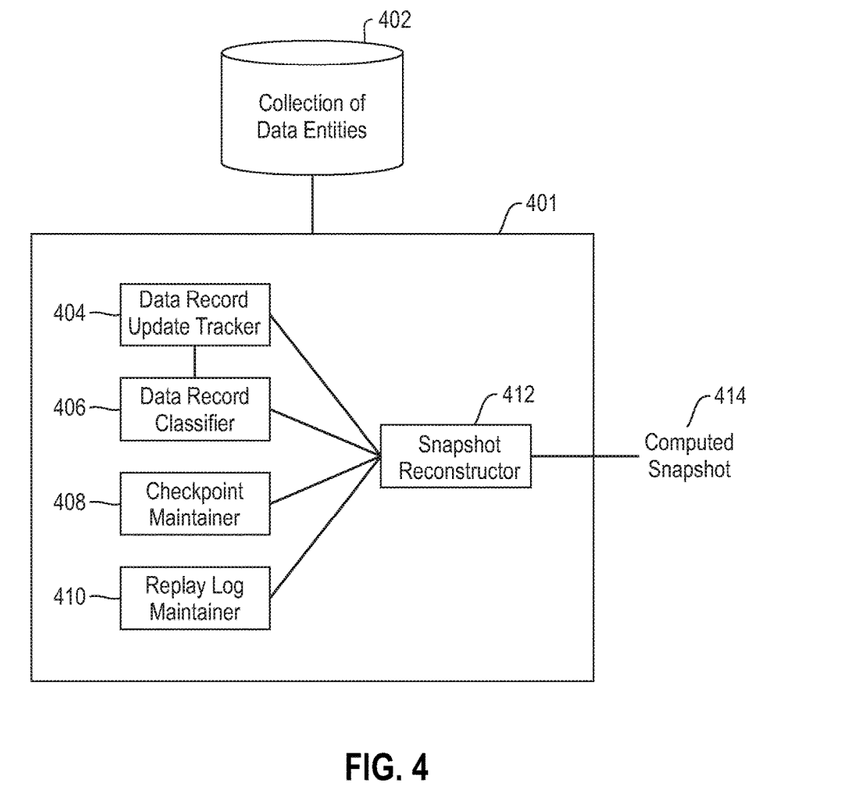
FIG. 4 is a diagram illustrating system architecture, according to an embodiment of the invention.

FIG. 4 is a diagram illustrating system architecture, according to an embodiment of the invention. By way of example, FIG. 4 depicts a collection of data entities (also referred to herein as data records) 402 and a historical snapshot computation system 401. The historical snapshot computation system 401 includes a data record update tracker 404, a data record classifier 406, a checkpoint maintainer 408, a replay log maintainer 410, and a snapshot reconstructor 412.

Whenever updates are made to the collection of data entities 402, the data record update tracker 404 maintains statistics about which entity is being updated rarely versus more frequently. The data record classifier 406 consults the data record update tracker 404 to obtain the statistics on how frequently the data entities are getting updated, and uses such information to partition the data entities into different partitions. In addition to update-frequency statistics, the data record classifier 406 can also utilize statistics pertaining to the size of data records to determine how to partition the data into different partitions (for example, based on the update-frequency and the size of the data records). Additionally, the checkpoint maintainer 408 creates and stores on-disk partial checkpoints for a specified set of data records corresponding to a partition at the specified instant of time. Further, the checkpoint maintainer 408 can also retrieve previously-created partial checkpoints by prioritizing the caching of partial checkpoints of slow-changing partitions over fast-changing partitions.

The replay log maintainer 410 maintains a log of the operations and/or transactions that are applied to the collection of data entities, and can replay the subset of operations and/or transactions occurring within a specified time-interval [t_replay-start, t_replay-end]. Additionally, the snapshot reconstructor 412 interacts with components 404, 406, 408, and 410 to generate an output of a computed snapshot 414. For example, the snapshot reconstructor 412 interacts with the checkpoint maintainer 408 to retrieve the latest checkpoints from each of the partitions before a given historic time 't,' interacts with the replay log maintainer 410 to replay the operations within each partition in the time-interval between the latest checkpoint in that respective partition and the historic query time 't,' and also combines the partially computed snapshot within each partition to compute the desired snapshot S(t) 414.

By way merely of illustration, consider the following example scenario that includes two partitions: a fast-moving partition and a slow-moving partition. Further, in this example, assume that the slow-moving partition entities constitute 90% of the total entities, and the fast-moving partition entities constitute 10% of the total entities. Additionally, assume that the number of updates across all fast-moving entities is 100 times greater than the number of updates across all slow-moving entities. Accordingly, consider the following comparison of checkpoint (that is, storage) overhead and replay (that is, query response time) overhead of an un-partitioned approach and a partitioning approach (such as implemented via one or more embodiments of the invention).

Using the un-partitioned approach, assume that a checkpoint interval of T is chosen, and the number of updates per second across all the fast-moving entities is U. Also, assume that the total duration of historical time to which the system caters is H. Accordingly, using the un-partitioned approach, the storage cost of slow-moving entities=(H/T)*S_entity*(the number of slow-moving entities), and the storage cost of fast-moving entities=(H/T)*S_entity*(the number of fast-moving entities). Also, the total storage cost=(H/T)*S_entity*(the total number of entities), the replay cost of fast-moving entities=T*U, the replay cost of slow-moving entities=T*U/100, and the total replay cost=T*(U+U/100)=approximately T*U.

Using a partitioning approach (such as implemented via one or more embodiments of the invention), a checkpoint interval of T can be utilized for the fast-moving partition, and a checkpoint interval of 100 T can be utilized for the slow-moving partition because the number of updates for slow-moving entities is 100 times lesser than those for fast-moving entities. Accordingly, using the partitioning approach, the storage cost of slow-moving entities=(1/100)*(H/T)*S_entity*(the number of slow-moving-entities). That is, the storage cost of slow-moving entities is 100× lesser than that of the un-partitioned approach. Additionally, the storage cost of fast-moving entities=(H/T)*S_entity*(the number of fast-moving entities), and the total storage cost=(H/T)*S_entity*(1/100*(the number of slow-moving entities+the number of fast-moving entities))=(H/T)*S_entity*((1/100*90/100*#total entities)+(10/100*the number of total entities))=(H/T)*S_entity*(0.9/100+10/100)*the number of total entities=(H/T)*S_entity*0.1. Thus, the total storage cost from checkpoints is ten times less than from the un-partitioned approach.

Figure 5:
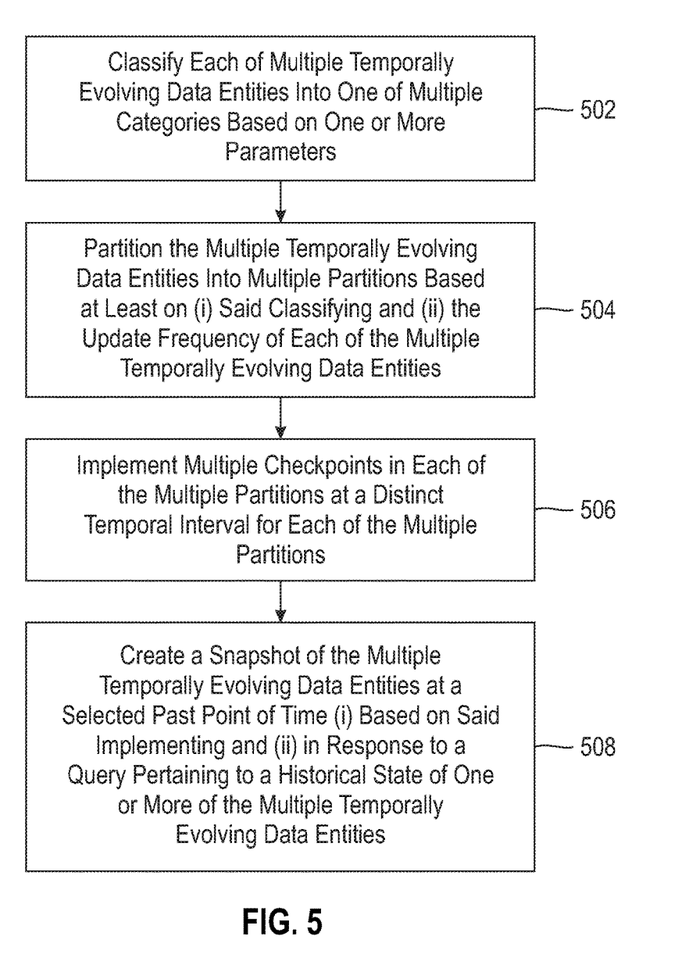
FIG. 5 is a flow diagram illustrating techniques according to an embodiment of the invention.

FIG. 5 is a flow diagram illustrating techniques according to an embodiment of the present invention. Step 502 includes classifying each of multiple temporally evolving data entities into one of multiple categories based on one or more parameters. The one or more parameters can include, for example, the average lifespan of each of the multiple temporally evolving data entities.

Step 504 includes partitioning the multiple temporally evolving data entities into multiple partitions based at least on (i) said classifying and (ii) the update frequency of each of the multiple temporally evolving data entities. The update frequency can include, for example, the average update frequency of each of the multiple temporally evolving data entities. The multiple partitions can include a number of partitions determined based on one or more user-determined variables such as, for example, a desired distribution of size with respect to each of the multiple partitions.

Step 506 includes implementing multiple checkpoints in each of the multiple partitions at a distinct temporal interval for each of the multiple partitions. Implementing can include implementing multiple checkpoints in a partition associated with low update-frequency temporally evolving data entities at a larger temporal interval than in a partition associated with high update-frequency temporally evolving data entities.

Step 508 includes creating a snapshot of the multiple temporally evolving data entities at a selected past point of time (i) based on said implementing and (ii) in response to a query pertaining to a historical state of one or more of the multiple temporally evolving data entities. The techniques depicted in FIG. 5 can also include storing one or more portions of the snapshot in a memory device.

Additionally, at least one embodiment of the invention can also include caching the implemented checkpoints across the multiple partitions, and creating a snapshot of the multiple temporally evolving data entities at a selected past point of time (i) based on the cached checkpoints and (ii) in response to a query pertaining to a historical state of one or more of the multiple temporally evolving data entities. Such an embodiment can also include prioritizing caching of checkpoints in a partition associated with low update-frequency temporally evolving data entities over caching of checkpoints in a partition associated with high update-frequency temporally evolving data entities. Further, such an embodiment can additionally include re-using one or more computations across queries pertaining to points of time within a predetermined temporal vicinity based on said caching.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
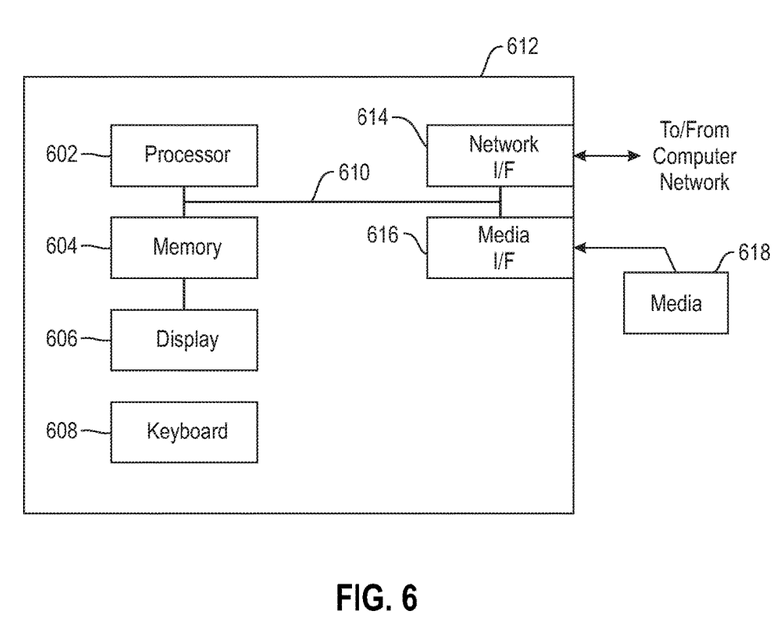
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, constructing a snapshot based on temporally evolving data that are partitioned based on the average live-span and/or the average update frequency of the data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
classifying each of multiple temporally evolving data entities into one of multiple categories based on one or more parameters, wherein the one or more parameters comprise the average lifespan of each of the multiple temporally evolving data entities;
partitioning the multiple temporally evolving data entities into multiple partitions based at least on (i) said classifying and (ii) the update frequency of each of the multiple temporally evolving data entities;
implementing multiple checkpoints at a distinct temporal interval for each of the multiple partitions; and
creating a snapshot of the multiple temporally evolving data entities at a selected past point of time (i) based on said implementing and (ii) in response to a query pertaining to a historical state of one or more of the multiple temporally evolving data entities;
wherein the steps are carried out by at least one computing device.

2. The computer-implemented method of claim 1, wherein the update frequency comprises the average update frequency of each of the multiple temporally evolving data entities.

3. The computer-implemented method of claim 1, wherein said implementing comprises implementing multiple checkpoints in a partition associated with low update-frequency temporally evolving data entities at a larger temporal interval than in a partition associated with high update-frequency temporally evolving data entities.

4. The computer-implemented method of claim 1, wherein the multiple partitions comprise a number of partitions determined based on one or more user-determined variables.

5. The computer-implemented method of claim 4, wherein the one or more user-determined variables comprises a desired distribution of size with respect to each of the multiple partitions.

6. The computer-implemented method of claim 1, comprising:
storing one or more portions of the snapshot in a memory device.

7. A computer program product comprising a computer readable storage medium having program instructions embodied therewith, the program instructions executable by a device to cause the device to:
classify each of multiple temporally evolving data entities into one of multiple categories based on one or more parameters, wherein the one or more parameters comprise the average lifespan of each of the multiple temporally evolving data entities;
partition the multiple temporally evolving data entities into multiple partitions based at least on (i) said classifying and (ii) the update frequency of each of the multiple temporally evolving data entities;
implement multiple checkpoints at a distinct temporal interval for each of the multiple partitions; and
create a snapshot of the multiple temporally evolving data entities at a selected past point of time (i) based on said implementing and (ii) in response to a query pertaining to a historical state of one or more of the multiple temporally evolving data entities.

8. The computer program product of claim 7, wherein the update frequency comprises the average update frequency of each of the multiple temporally evolving data entities.

9. The computer program product of claim 7, wherein said implementing comprises implementing multiple checkpoints in a partition associated with low update-frequency temporally evolving data entities at a larger temporal interval than in a partition associated with high update-frequency temporally evolving data entities.

10. The computer program product of claim 7, wherein the multiple partitions comprise a number of partitions determined based on one or more user-determined variables.

11. The computer program product of claim 10, wherein the one or more user-determined variables comprises a desired distribution of size with respect to each of the multiple partitions.

12. The computer program product of claim 7, wherein the program instructions executable by a computing device further cause the computing device to:
store one or more portions of the snapshot in a memory device.

13. A system comprising:
a memory; and
at least one processor coupled to the memory and configured for:
classifying each of multiple temporally evolving data entities into one of multiple categories based on one or more parameters, wherein the one or more parameters comprise the average lifespan of each of the multiple temporally evolving data entities;
partitioning the multiple temporally evolving data entities into multiple partitions based at least on (i) said classifying and (ii) the update frequency of each of the multiple temporally evolving data entities;
implementing multiple checkpoints at a distinct temporal interval for each of the multiple partitions; and
creating a snapshot of the multiple temporally evolving data entities at a selected past point of time (i) based on said implementing and (ii) in response to a query pertaining to a historical state of one or more of the multiple temporally evolving data entities.

14. A computer-implemented method, comprising:
classifying each of multiple temporally evolving data entities into one of multiple categories based on one or more parameters, wherein the one or more parameters comprise the average lifespan of each of the multiple temporally evolving data entities;
partitioning the multiple temporally evolving data entities into multiple partitions based at least on (i) said classifying and (ii) the update frequency of each of the multiple temporally evolving data entities;

implementing multiple checkpoints at a distinct temporal interval for each of the multiple partitions;

caching the implemented checkpoints across the multiple partitions; and creating a snapshot of the multiple temporally evolving data entities at a selected past point of time (i) based on the cached checkpoints and (ii) in response to a query pertaining to a historical state of one or more of the multiple temporally evolving data entities;

wherein the steps are carried out by at least one computing device.

15. The computer-implemented method of claim 14, wherein said caching comprises prioritizing caching of checkpoints in a partition associated with low update-frequency temporally evolving data entities over caching of checkpoints in a partition associated with high update-frequency temporally evolving data entities.

16. The computer-implemented method of claim 14, comprising:

re-using one or more computations across queries pertaining to points of time within a predetermined temporal vicinity based on said caching.

17. The computer-implemented method of claim 14, wherein the update frequency comprises the average update frequency of each of the multiple temporally evolving data entities.

\* \* \* \* \*